United States Patent [19]

Cheng

[11] Patent Number: 4,826,798
[45] Date of Patent: May 2, 1989

[54] CARBON DIOXIDE CALCINATION OF METHANOL DISSOCIATION CATALYSTS

[75] Inventor: Wu-Hsun Cheng, Kennett Square, Pa.

[73] Assignee: E. I. Du Pont de Nemours and Company, Wilmington, Del.

[21] Appl. No.: 164,453

[22] Filed: Mar. 4, 1988

[51] Int. Cl.$^4$ .......................... B01J 21/06; B01J 23/72
[52] U.S. Cl. ..................................... 502/244; 502/345
[58] Field of Search ................. 502/241, 244, 345, 344

[56] References Cited

U.S. PATENT DOCUMENTS

| | | | |
|---|---|---|---|
| 4,226,839 | 10/1980 | O'Neill et al. | 423/177 |
| 4,431,566 | 2/1984 | Suzuki et al. | 252/373 |
| 4,504,599 | 3/1985 | Sasaki et al. | 502/304 |

FOREIGN PATENT DOCUMENTS 544891 8/1957 Canada .

OTHER PUBLICATIONS

Stiles, Catalyst Manufacture, Marcel Dekker, New York.

Primary Examiner—W. J. Shine

[57] ABSTRACT

An improvement process for the preparation of copper-containing methanol dissociation catalysts by precipitation of a copper-containing catalyst precursor, calcination, and reduction of the precursor, the improvement comprising conducting the calcination of the precursor in an atmosphere of $CO_2$.

4 Claims, No Drawings

CARBON DIOXIDE CALCINATION OF METHANOL DISSOCIATION CATALYSTS

BACKGROUND OF THE INVENTION

The most widely used methanol dissociation catalysts contain copper or copper oxides in intimate association with other transition metals or their oxides, or alkaline earth metals or their oxides. The preparation of these methanol dissociation catalysts generally involves co-precipitation of all constituents (except perhaps the silica) from a common solution of their soluble metal salts (e.g., the nitrates) the product insoluble salts in intimate association as the precipitate.

The resulting precipitate is usually calcined, i.e., heated sufficiently to remove water, organic solvents and salts, and to give the catalyst a certain degree of structural integrity. Calcination is generally conducted at elevated (200° C.-700° C.) temperatures. Higher temperatures may cause sintering of the catalyst, with attendant loss of activity due to a reduction in surface area. An oxidizing atmosphere, e.g. air or oxygen, facilitates the conversion of various metal salts to their respective matal oxides. In many instances, the metal oxides are the catalytically active species. For other catalysts, the metal oxides may be reduced, for example with hydrogen, to form the active catalyst.

The choice of calcining atmosphere depends on the catalyst being treated. Stiles, *Catalyst Manufacture*, Marcel Dekker, New York, discloses that the atmosphere in which catalysts are calcined can be steam, oxygen, carbon dioxide, nitrogen, hydrogen, or carbon monoxide, but no criteria are given for choosing the best calcining atmosphere.

In some references in the prior art, the atmosphere is specified to be "air", but more commonly the nature of the calcining atmosphere used in the preparation of methanol dissociation catalysts is undefined. U.S. Pat. No. 4,431,566 discloses a process for the catalytic conversion of methanol into hydrogen and carbon monoxide using a catalyst comprised of alumina as a carrier material and nickel and potassium carried on the carrier material. Preparation of the catalyst includes calcination in an atmosphere of oxygen.

SUMMARY OF THE INVENTION

The present invention provides for an improvement in the process for preparation of copper-containing methanol dissociation catalysts by (a) combining an aqueous solution of metal salts including at least one copper salt with an aqueous base, optionally containing a source of silicon, to precipitate a copper-containing catalyst precursor, (b) recovering the precipitated precursor, (c) calcinating the recovered precursor at elevated temperatures, and (d) reducing the calcination precursor, the improvement comprising conducting the calcination of the recovered precursor in an atmosphere of carbon dioxide.

DETAILED DESCRIPTION OF THE INVENTION

In a typical art preparation of a methanol dissociation catalysts, an aqueous solution of the metal salts is added slowly and with vigorous stirring to silica dispersed in an aqueous solution of sodium carbonate. In some instances, the aqueous solution of sodium carbonate is replaced with a slurry or solution of calcium carbonate, calcium hydroxide, or sodium hydroxide. After precipitation and mixing are complete, the slurry is filtered to remove the excess liquid and then washed with warm water to remove the by-products of the precipitation process. To minimize the formation of hard agglomerates during the drying process, the wet product may be reslurried with acetone and then dried under a partial vacuum. In accordance with this invention, the resulting catalyst precursor is heated in a carbon dioxide atmosphere at a pressure of 10 kPa to $5 \times 10^3$ kPa and a temperature of 150° C. to 600° C., for at least 20 min., typically 3 h, to calcine the catalyst, thereby converting the various metal salts to their respective metal oxides. Before its use in the methanol dissociation reaction, the calcined catalyst is reduced in a $N_2/H_2$ or CO atmosphere.

In general, catalyst precursors lose about 23% of their weight during calcination and approximately an additional 8% during reduction. Therefore, the amount of sample loaded into the reactor, tube or furnace, was adjusted, depending on the stage of preparation, such that all catalyst samples would have approximately the same weight at the beginning of the methanol dissociation reaction.

Typically, about 2.0 g of calcined catalyst ($-12$, $+20$ mesh) was loaded in a $\frac{3}{8}''$ (0.953 cm) OD U-shaped reactor tube made of an Ni-Cr-Fe-Mn-Si-Cu alloy which was heated in a sandbath. Several grams of silicon carbide were loaded on the top of the catalyst bed to fill the reactor volume. The reactor system included two parallel reactors in separate sandbaths. Calcined catalysts were reduced before use in the methanol dissociation reactions by heating at 250° C. and 200 kPa in 100 sccm of $N_2/H_2$ (95/5) for about 3 h.

Preferred $CO_2$ pressures during calcination are from 100 kPa to 500 kPa. Preferred calcination temperatures are 200° C. to 400° C.; most preferred temperatures are 300° C. to 350° C.

In the following description all catalyst compositions are expressed as a weight percent of the sum of the weights of transition metals, alkaline earth metals and, if present, silicon.

The copper content of the methanol dissociation catalysts is 5% to 100% by weight, preferably 20% to 90%. The catalyst may also contain one or more transition metals or alkaline earth metals or their oxides or hydroxides chosen from the group of chromium, molybdenum, tungsten, manganese, technetium, rhenium, iron, ruthenium, osmium, palladium, gold, zinc, mercury, magnesium, calcium, barium, and strontium. Preferred metal additives are chromium (5% to 75%), manganese (1% to 5%), and alkaline earth elements (1% to 15%).

The catalyst may also contain silicon in the form of silica, silicates or silicic acids. The amount of silica present is not critical. It may constitute a minor component of the catalyst, as little as 0.1%, or it may be a major component of the catalyst and serve as a catalyst support. Preferably the catalyst contains 0.1% to 15% silica.

Suitable sources of the transition metals include the water-soluble salts of the metals which do not contain elements capable of acting as catalyst poisons, such as halogen or sulfur. Examples of suitable transition metal sources are nitrates, acetates, oxalates and amine carbonates. Most preferred are the nitrates.

Similarly, suitable sources of the alkaline earth metals include salts of the alkaline earth metal which do not contain halogen or sulfur. Examples of suitable alkaline earth metal salts are acetates, benzoates, butyrates, carbonates, citrates, formates, lactates, nitrates, nitrites, oxides, propionates, salicylates, silicates and valerates. Most preferred are nitrates.

Suitable sources of silica include, for example, sodium silicate, silica hydrosol, silica gel, silica sol and silicic acid. The preferred source of silica is an aqueous colloidal dispersion of silica particles. Suitable commercial sources of silica include Ludox ™ Colloidal Silica, available from DuPont and Cabosil ™, available from Cabot Corporation.

EXAMPLES

General Procedures

The methanol dissociation reaction was generally conducted at 250° C., 2 atm (200 kPa); the flowrate was variably set at 17.5, 35 or 105 sccm.

The reaction products were analyzed by two gas chromatographs connected in series and equipped with thermoconductivity detectors. $CO_2$, methanol, methyl formate, dimethyl ether, water and other high boiling products were separated and analyzed in the first GC column (80/100 Porapak T, 150"×8' packed column), operated in a temperature-programming mode from 100° C. to 160° C. at 8 C/min. Gaseous products such as CO, $H_2$, and methane were separated and analyzed in the second column (molecular sieves 5A, 150"×8' packed column) operated at 70° C. The carrier gas for both chromatographs was 8.5% $H_2$ in He at 39 sccm.

The conversion of methanol is defined as moles of methanol converted per mole of methanol fed to the reactor. CO and hydrogen are the major products; other products include small amounts of $CO_2$, dimethyl ether, methyl formate and trace amounts of water and methane.

The selectivity to CO is defined as moles of CO produced per mole of methanol reacted.

The activity of the catalysts decreases slightly during the first few hours of use in the methanol dissociation reaction. Conversion and selectivity values listed in table 2 were compared under "quasi-stable" conditions, i.e. after 14–20 h of reaction.

Catalyst precursor compositions are summarized in Table 1. Calcination conditions are summarized in Table 2. Methanol dissociation results are summarized in Table 3.

EXAMPLES 1–4

Preparation of $CO_2$-Calcined Catalysts 1–4 and Comparative Catalysts A–F

The precursor for catalyst 1 was prepared by charging a separatory funnel with 500 mL of an aqueous solution of $Cu(NO_3)_2 \cdot 3H_2O$ (76.25 g), $Cr(NO_3)_3 \cdot 9H_2O$ (51.25 g), and $Mn(NO_3)_2$ (3.6 g, 50–52 wt%). The funnel was positioned above the glass mixing jar of a standard 1250 cc Hamilton Beach food blender, which was charged with 400 mL of an aqueous slurry of $SiO_2$ (1.52 g, Cabosil ™) and $Na_2CO_3$ (70 g). Attached to the outlet end of the funnel was a 10 mm OD glass tube of sufficient length to extend down through the jar cover to within ⅛" of the blender blades. The solution from the funnel was added over 15–30 min to the rapidly stirring slurry in the blender. The resulting precipitate was separated by filtration and washed with warm water until the washings were neutral (pH 6–7). The resulting powder was transferred to a clean blender, reslurried with acetone, filtered and the washing process repeated. The resulting free-flowing powder was reslurried with acetone and dried on a rotary evaporator at 60° C. to give a granulated powder.

Catalyst precursor particles in the −12, +20 mesh size range were calcined and then reduced in $N_2/H_2$ (95/5). Precursors for catalysts 3–4 and the comparative catalysts A–F were prepared essentially as described for the precursor for catalyst 1. Catalyst 2 was obtained by repressing and then crushing the precursor for catalyst 1.

EXAMPLE 5

Preparation of $CO_2$-Calcined Catalyst 5 and Comparative Catalysts G–H

Catalyst precursor was prepared as for catalysts 1–3, except that Ludox ™ HS-40 (3.8 g) was substituted for the Cabosil ™ as the aqueous colloidal dispersion of silica.

EXAMPLE 6

Preparation of $CO_2$-Calcined Catalyst 6 and Comparative Catalyst I

Catalyst precursor was prepared as for catalysts 1–4, except that the Cabosil ™ aqueous colloidal dispersion of silica was omitted.

EXAMPLE 7

Preparation of $CO_2$-Calcined Catalyst 7 and Comparative Catalyst J

Catalyst precursor was prepared by adding 500 mL of an aqueous solution of $Cu(NO_3)_2 \cdot 0.3H_2O$ (27.33 g) and $Zn(NO_3)_2 \cdot 0.6H_2O$ (76.76 g) to a vigorously stirred solution of $Na_2CO_3$ (50 g) in 500 mL of water. The slurry was allowed to stand in a plastic beaker for 4 h, then filtered and the resulting solid washed well with water. The solid was slurried with acetone, filtered and dried to obtain a free-flowing powder.

EXAMPLE 8

Preparation of $CO_2$-Calcined Catalyst 8 and Comparative Catalysts K–L

Catalyst precursor was prepared by adding 400 mL of an aqueous solution of $Cu(NO_3)_2 \cdot 0.3H_2O$ (59.185 g), $Cr(NO_3)_3 \cdot 0.9H_2O$ (31.95 g) and $Ba(NO_3)_2$ (5.11 g) to a rapidly stirred solution of Cabosil ™ (1.52 g) and NaOH (18 g) in 400 mL of water. The resulting solid was washed, filtered and dried as described for Examples 1–4.

EXAMPLE 9

Preparation of $CO_2$-Calcined Catalyst 9 and Comparative Catalyst M

Catalyst precursor was prepared by repeating the procedure described in Example 7, using $Cu(NO_3)_2 \cdot 0.3H_2O$ (72.8 g), $Cr(NO_3)_3 \cdot 0.9H_2O$ (47.36 g) and $Zn(NO_3)_2 \cdot 0.6H_2O$ (60.67 g) in the metal salt solution.

TABLE 1

| Catalyst | Catalyst Precursor Compositions[a] | | | | | |
| --- | --- | --- | --- | --- | --- | --- |
| | Cu | CR | Mn | Si | Zn | Ba |
| 1–4, A–F | 70.3 | 23.3 | 3.9 | 2.5 | — | — |
| 5, G–H | 70.3 | 23.4 | 3.9 | 2.4 | — | — |
| 6, I | 72.1 | 23.9 | 4.0 | — | — | — |
| 7, J | 29.9 | — | — | — | 70.1 | — |
| 8, K–L | 67.4 | 17.9 | — | 3.1 | — | 11.7 |

TABLE 1-continued

Catalyst Precursor Compositions[a]

| Catalyst | Cu | CR | Mn | Si | Zn | Ba |
|---|---|---|---|---|---|---|
| 9[b], M[b] | 48 | 18 | — | — | 33 | — |

[a]These compositions are weight %, based on metals.
[b]These compositions are weight %, based on metal oxides.

TABLE 2

Calcination Conditions

| Catalyst | Atm. | Temp. °C. | Press. psia | Flow sccm | Vessel Type |
|---|---|---|---|---|---|
| 1 | $CO_2$ | 300 | 30 | 5 | Reactor |
| A | Air | 300 | 15 | — | Furnace[a] |
| B | Air | 300 | 30 | 100 | Reactor |
| 2 | $CO_2$ | 300 | 30 | 50 | Reactor |
| C | MeOH | 250 | 30 | 35 | Reactor |
| 3 | $CO_2$ | 300 | 30 | 20 | Reactor |
| 4 | $CO_2$ | 300 | 15 | — | Tube[b] |
| D | $N_2$ | 300 | 30 | 20 | Reactor |
| E | Air | 300 | 30 | 20 | Reactor |
| F | Vac | 300 | — | — | Furnace[a] |
| 5 | $CO_2$ | 300 | 30 | 5 | Reactor |
| G | Air | 300 | 30 | 100 | Reactor |
| H | $H_2/N_2$ | 250 | 30 | 100 | Reactor |
| 6 | $CO_2$ | 300 | 15 | — | Tube[b] |
| I | Air | 300 | 15 | — | Tube[b] |
| 7 | $CO_2$ | 300 | 30 | 47 | Reactor |
| J | $N_2$ | 300 | 30 | 50 | Reactor |
| 8 | $CO_2$ | 250 | 15 | — | Furnace[a] |
| K | Vac | 250 | — | — | Furnace[a] |
| L | Vac | 450 | — | — | Furnace[a] |
| 9 | $CO_2$ | 300 | 30 | 50 | Reactor |
| M | $N_2/H_2$ | 250 | 30 | 100 | Reactor |

[a]Conventional furnace
[b]2" O.D. quartz tube

TABLE 3

Conversion and Selectivity of Methanol Dissociation Catalysts

| Catalyst[a] | Calc. Atm. | Temp. | Methanol Dissociation[f] Flow | Conv. | Sel. |
|---|---|---|---|---|---|
| 1 | $CO_2$ | 250 C. | 35 sccm | 84.4 | 88.4 |
| A[b] | Air | 250 | 35 | 72.3 | 92.3 |
| B | Air | 250 | 35 | 81.7 | 89.4 |
| 2 | $CO_2$ | 250 | 35 | 72.3 | 90.0 |
| C | MeOH | 250 | 35 | 48.4 | 81.4 |
| 3 | $CO_2$ | 250 | 35 | 90.6 | 91.5 |
| 4[c] | $CO_2$ | 250 | 35 | 79.4 | 90.9 |
| D | $N_2$ | 250 | 35 | 75.9 | 91.9 |
| E | Air | 250 | 35 | 74.1 | 92.0 |
| F[b] | Vac | 250 | 35 | 72.1 | 91.7 |
| 5 | $CO_2$ | 250 | 35 | 65.1 | 90.5 |
| G | Air | 250 | 35 | 59.8 | 89.9 |
| H | $H_2/N_2$ | 250 | 35 | 59.5 | 88.3 |
| 6[d] | $CO_2$ | 250 | 17.5 | 66.5 | 91.3 |
| I[d] | Air | 250 | 17.5 | 60.8 | 89.2 |
| 6[d] | $CO_2$ | 274 | 17.5 | 85.2 | 93.3 |
| I[d] | Air | 274 | 17.5 | 68.5 | 91.7 |
| 7 | $CO_2$ | 250 | 35 | 19.5 | 77.5 |
| J | $N_2$ | 250 | 35 | 9.8 | 67.2 |
| 8[b] | $CO_2$ | 250 | 35 | 80.0 | 93.0 |
| K[b] | Vac | 250 | 35 | 73.8 | 91.0 |
| L[e] | Vac | 250 | 35 | 65.6 | 90.6 |
| 8[b] | $CO_2$ | 274 | 105 | 73.2 | 92.5 |
| K[b] | Vac | 274 | 105 | 61.9 | 89.2 |
| L[e] | Vac | 274 | 105 | 58.8 | 86.8 |
| 9 | $CO_2$ | 250 | 35 | 18.9 | 55.3 |
| M | $N_2/H_2$ | 250 | 35 | 15.2 | 42.6 |

[a]The reactor contained cancined, reduced catalyst obtained from 2.6 g of catalyst precursor, unless otherwise noted.
[b]Furnace loaded with 2.0 g of calcined catalyst.
[c]Tube loaded with 1.8 g of reduced catalyst.
[d]Tube loaded with 0.9 g of reduced catalyst.
[e]Furnace loaded with 1.8 g of calcined catalyst.
[f]The reaction pressure was 2 atm for those reactions run at 250° C.; the reaction pressure was 3 atm for those run at 274° C.

What is claimed is:

1. In a process for the preparation of copper-containing methanol dissociation catalysts by:
   (a) combining an aqueous solution of metal salts including at least one copper salt with an aqueous base, optionally containing a source of silicon, to precipitate a copper-containing catalyst precursor,
   (b) recovering the precipitated precursor of (a),
   (c) calcining the recovered precursor of (b) at elevated temperatures, and,
   (d) reducing the calcined precursor of (c),
   the improvement comprising conducting the calcination of (c) in an atmosphere of carbon dioxide.

2. The process of claim 1 wherein the atmosphere of carbon dioxide is at a pressure of 10 kPa to 5000 kPa and a temperature of 150° C. to 600° C.

3. The process of claim 1 wherein the atmosphere of carbon dioxide is at a pressure of 100 kPa to 500 kPa and a temperature of 200° C. to 400° C.

4. The process of claim 1 wherein the atmosphere of carbon dioxide is at a pressure of 100 kPa to 500 kPa and a temperature of 300° C. to 350° C.

* * * * *